(12) United States Patent
Immordino et al.

(10) Patent No.: US 6,355,099 B1
(45) Date of Patent: Mar. 12, 2002

(54) PLASTER MIXTURE FOR FORMING A MACHINABLE COMPOSITION

(75) Inventors: Salvatore C. Immordino, Trevor, WI (US); Raymond A. Kaligian, II, Geneva, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 09/502,740

(22) Filed: Feb. 11, 2000

(51) Int. Cl.⁷ .............................................. C04B 11/00
(52) U.S. Cl. ........................ 106/778; 106/779; 106/780; 106/783; 264/333; 427/355; 427/403; 427/427
(58) Field of Search ................................. 106/778, 779, 106/780, 783; 264/333; 427/355, 403, 427

(56) References Cited

U.S. PATENT DOCUMENTS

| | | | |
|---|---|---|---|
| 3,414,462 A | 12/1968 | Cafferata | 428/218 |
| 3,445,323 A | 5/1969 | Schnabel | 428/330 |
| 3,622,361 A | 11/1971 | Bolton et al. | 106/711 |
| 3,719,513 A | 3/1973 | Bragg et al. | 106/640 |
| 4,061,614 A | * 12/1977 | Self | 523/505 |
| 4,587,279 A | 5/1986 | Salyer et al. | 523/206 |
| 4,804,688 A | * 2/1989 | Vassileff | 521/64 |
| 4,876,142 A | 10/1989 | Piccirillo | 442/43 |
| 5,482,551 A | 1/1996 | Morris et al. | 106/772 |
| 5,534,059 A | 7/1996 | Immordino, Jr. | 106/778 |
| 5,741,844 A | 4/1998 | Nass et al. | 524/523 |

OTHER PUBLICATIONS

Chemical Abstract No. 105:28885, abstract of Hungarian Patent Specification No. 34528 (Mar. 1985).*

* cited by examiner

*Primary Examiner*—Anthony Green
(74) *Attorney, Agent, or Firm*—Greer, Burns & Crain, LTD; John M. Lorenzen; David F. Janci (57) ABSTRACT

A plaster mixture for forming a machinable composition, includes calcium sulfate hemihydrate; an internal lubricating dispersable binder, and an adhesive binder for adhering the plaster mixture to a substrate. In the preferred embodiment, the composition includes calcium sulfate hemihydrate, a poly(ethylene glycol) internal binder, and an ethylene/vinyl acetate copolymer adhesive binder.

26 Claims, 4 Drawing Sheets

PLASTER MIXTURE FOR FORMING A MACHINABLE COMPOSITION

BACKGROUND OF THE INVENTION

The present invention relates to a plaster mixture for forming a machinable composition, and specifically to a plaster mixture which can be adapted to be poured into a mold, trowel applied, or spray applied to a substrate, and machined to a desired shape to produce a dimensionally accurate model.

In some types of manufacturing, the molds used in production are cast from models. One method of making a model involves shaping a substrate with CNC or other high performance milling machine. In applications where the models are large, such as in the automobile, watercraft and aerospace industries, a large volume of substrate material is necessary to build a model. Therefore, it is desirable that the substrate material be lightweight and economical. Also, the material must be machinable to a high degree of dimensional accuracy. Accordingly, the material must be able to hold a sharp corner and a smooth contour and be dimensionally stable from room temperature through 250° F.

To produce large models, it is common to first fabricate a substrate that is sized slightly less than the full size model. Inexpensive materials such as tooling boards, Styrofoam and the like are commonly used to fabricate the substrate. The substrate is coated with successive layers of a machinable material until the substrate is larger than the model. Finally, the coated substrate is machined into the desired shape.

Plaster mixtures for forming machinable compositions are known. Notably, U.S. Pat. No. 5,534,059 to Immordino describes a high density gypsum composition for use as a machinable composition, which is readily carvable, is able to hold sharp corners and smooth contours, and is dimensionally stable from room temperature to 250° F. This plaster contains a polymer binder for increasing strength of the plaster and for preventing the generation of dust during machining. As disclosed in the Immordino patent, the binder is an ethylene/vinyl/acetate/vinyl chloride terpolymer. Up to 10 to 20 percent by weight of polymer binder is preferably added to the plaster to obtain the desired consistently. The composition of Immordino discloses the addition of an internal lubricating agent to minimize friction during machining. Further, this composition may not be spray applied to a substrate since, if sprayed, due to the effects of gravity, the composition will flow prior to set and before building up a machinable thickness.

Machinable materials adapted to be spray applied on a substrate are also known, namely, polyester and polyurethane foams. Polyester is undesirable because it is possible to apply only about a 1/16 inch coat at a time. Therefore, numerous coats of polyester are needed to build tip an appreciable thickness. Also, because each coat must be allowed to dry before the next coat, this method is time consuming.

Polyurethane foams are undesirable because they do not produce a coat with a uniform thickness and the coats normally have numerous air pockets. Therefore, to achieve dimensional accuracy, significant surface preparation is necessary following machining. Polyester and polyurethane foams generate static electricity and undesirable amounts of dust during machining. The combination of the static and the dust creates an unwanted mess. Further, the isocyanate used for curing the polyurethanes is a known carcinogen.

Thus, it is a first object of the present invention to provide an improved machinable composition which can be found from a plaster mixture, poured into a mold or applied by trowel.

Another object of the present invention is to provide an improved plaster mixture which is both sprayable and forms a composition which is machinable.

Yet another object of the present invention is to provide an improved sprayable plaster mixture which will build up a machinable thickness in a single coat when sprayed on a substrate.

It is a further object of the present invention to provide an improved sprayable plaster which can form a composition which generates shavings and relatively little dust when machined.

Yet another object of the present invention is to provide an improved sprayable plaster that provides for relatively little expansion and a relatively small number of air pockets upon set.

Still another object of the present invention is to provide an improved method for making a model using a sprayable plaster mixture for forming a machinable composition.

BRIEF SUMMARY OF THE INVENTION

The above listed objects are met or exceeded by the present sprayable plaster mixture which can be poured into a mold or applied by spray or trowel to a substrate and machined to a desired shape after set. The present invention also provides a method for using the plaster mixture to economically produce large models.

More specifically, the a plaster mixture is provided for forming a machinable composition, the mixture includes calcium sulfate hemihydrate, an internal lubricating dispersable binder; and an adhesive binder for adhering the plaster mixture to a substrate. In the preferred embodiment, the composition includes calcium sulfate hemihydrate, amorphous poly(ethylene glycol) internal binder, and an ethylene-vinyl acetate copolymer based adhesive binder.

A second embodiment featuring a sprayable slurry capable of adhering to a horizontal surface is achieved with the addition of a thickening agent to the first embodiment. The thickening agent allows the slurry to form a machinable thickness when spray applied. In the preferred second embodiment, the thickening agent is cellulose based, and is preferably methylcellulose.

A third embodiment featuring a slurry capable of adhering to both vertical and horizontal surfaces is achieved with the addition of an accelerating agent to the second embodiment. The accelerating agent reduces the slurry set time after the slurry is spray applied to a substrate.

A lightweight inert filler may be added to any of the three embodiments to reduce the machinable thickness final weight and also to adjust the slurry density. Further, any of the three embodiments may also include a defoaming agent, set accelerants and/or set retarders to suit particular applications.

In addition, the present invention features a method for making a model by spraying one or more coats of the mixture described in the third embodiment onto a substrate and allowing the slurry to set to form a machinable thickness. Once set, the substrate is machined to the desired shape of the model.

DETAILED DESCRIPTION OF THE INVENTION

The invention relates to a dry plaster-based mixture which, when combined with water, creates a slurry. Once applied to a substrate or poured into a mold, the slurry sets and hardens to form a machinable thickness.

Plaster is a generic term usually referring to a calcium sulfate based composition. Water is mixed with a base plaster, calcium sulfate hemihydrate ($CaSO_4 \cdot \frac{1}{2}H_2O$), to achieve a workable slurry.

The addition of water to the calcium sulfate hemihydrate begins the hydration of the hemihydrate to calcium sulfate dihydrate ($CaSO_4 \cdot 2H_2O$). After a given amount of time, the completion of the hydration reaction results in the setting or hardening of the slurry by the formation of an interlocking matrix of calcium sulfate dehydrate crystals.

The amount of water used determines the plasticity of the slurry. Plasticity is the property of plaster which permits permanent and continuous deformation in any direction. As opposed to low viscosity materials, plastic materials require a measurable force to initiate flow. A material of low plasticity is usually described as being "poor" or hard working; high plasticity is described in terms of "rich" or easy working.

In the first embodiment of the present invention, the dry mixture includes approximately 65 to 90 percent, preferably 90 percent, by weight calcium sulfate hemihydrate. Either alpha calcium sulfate hemihydrate ($\alpha$-$CaSO_4 \cdot \frac{1}{2}H_2O$) or beta calcium sulfate hemihydrate ($\beta$-$CaSO_4 \cdot \frac{1}{2}H_2O$) can be used in the mixture. The alpha version of calcium sulfate hemihydrate crystals is less acicular in shape than beta version. The less acicular shape allows the crystals to wet out and flow much better when mixed with water. The lower water demand of the alpha form results in a more closely packed, and higher density composite in comparison to the resultant interlocking matrix of calcium sulfate hemihydrate crystals utilizing the beta form of calcium sulfate hemihydrate. As is known in the art, the combination of alpha and/or beta calcium sulfate hemihydrate controls the amount of water needed to form a workable slurry, which controls the density of the final cast model.

Whether alpha or beta calcium sulfate hemihydrate is used in the mixture will depend on the desired slurry and plaster density. Further, if alpha and beta calcium sulfate hemihydrate are used in combination, one with ordinary skill in the art can determine the requisite ratio of alpha calcium sulfate hemihydrate to beta calcium sulfate hemihydrate necessary to achieve the desired slurry and plaster density. The preferred calcium sulfate hemihydrate is available under the trade name Hydrocal® C-Base hemihydrate, supplied by U.S. Gypsum Corporation, Chicago, Ill. Hydrocal® C-Base hemihydrate is the alpha form of calcium sulfate hemihydrate.

To provide a plaster that forms a composition that is machinable, the present invention includes an internal binder. The internal binder disperses in the slurry and later is deposited throughout the calcium sulfate dihydrate crystalline structure after set. Deposit of the internal binder throughout the interlocking calcium sulfate dihydrate crystals inhibits crack propagation within the crystalline structure. This allows the hardened composition to be dimensionally stable from room temperature to 250° F., and to hold a sharp corner and a smooth contour when machined. Further, the internal binder promotes the production of generally evenly sized shavings during machining and, results in a corresponding drastic reduction of dust.

In preferred embodiments, it is contemplated that the internal binder is a free flowing, water redispersable polymer powder having a glass transition temperature, $T_g$, sufficient to permit the polymer to be rigid at room temperature. In some preferred embodiments, the polymer is water soluble, and the degree of water solubility is inversely proportional to the molecular weight of the binder.

Preferably, the internal binder is a high molecular weight amorphous polyethylene glycol powder. Poly(ethylene glycol) is commercially available and also may be prepared by many known and conventional polymerization techniques. In the preferred embodiment, a poly(ethylene glycol) powder having an average molecular weight of 8,000 is used to provide uniform distribution of the polymer in the slurry. A non-powder form of poly(ethylene glycol) is also contemplated.

The addition of the free flowing, water redispersable polymer results in suitable machinability of the composition upon set. It has been found that this polymer slightly increases the plasticity of the slurry because of a hygroscopic effect. If the water to plaster ratio is fixed the hygroscopic effect will result in a slight thickening effect. The slight thickening effect enhances the ability of the formulation to be spray applied especially on vertical surfaces. In addition, poly(ethylene glycol) demonstrates inherent lubricating qualities. This quality results in the minimization of friction during machining and therefore the prevention of agglomorization of the internal binder while machining.

In the first embodiment, the dry mixture includes up to 13%, preferably 1–13% more preferably 4 to 12%, even more preferably approximately in the range of 6 to 8%, and most preferably 6%, by weight poly(ethylene glycol) powder. It is contemplated that, in the preferred ranges above, a lower concentration of the internal binder yields increased strength of the composition, but also increases wear on the machining equipment. At higher concentrations of this internal binder, the strength is lower but less wear on the machining equipment results. Therefore, in the preferred range of 6–8%, 6% will provide relatively greater strength, while 8% will provide relatively greater lubricity. Poly (ethylene glycol) powder is available under the trade name Carbowax® from Union Carbide of Danbury, Conn.

A highly branched, water redispersable, free flowing polymer, namely, methoxy polyethylene glycol, could also be used as an internal binder in place of the poly(ethylene glycol). In the present composition, a preferred molecular weight of the methoxy polyethylene glycol is between 2,000 and 5,000.

The dry mixture of the present composition also includes an adhesive binder for increasing the adhesive bond strength at the substrate/machinable thickness interface. Preferably, the adhesive binder is a redispersible polymer powder having adhesive properties. The adhesive binder should be hydrophobic to prevent migration with water to the air-exposed non-substrate-contacting surface of the machinable thickness. It is not crucial that the adhesive binder have a glass transition temperature, $T_g$, greater than room temperature, as the adhesive binder concentration in the dry mixture is low. Further, adhesive polymers having these physical properties can be added in either emulsion or redispersible powder form.

Preferably, the adhesive binder is a poly(vinyl acetate)-based polymer that is spray dried and coated with poly (vinyl alcohol) (also known as a protective colloid). The coating improves the water redispersion of the adhesive binder. In the first embodiment, the dry mixture includes up to 5 percent, preferably 2 percent, by weight ethylene/vinyl acetate copolymer. Ethylene/vinyl acetate copolymer is available under the trade name Airflex RP226® from Wacker Chemical of Allentown, Pa.

A pure vinyl acetate homopolymer may be used in place of the ethylene/vinyl acetate copolymer. Most commercially available vinyl acetate homopolymers that are sold in powder form are water redispersible, as the individual powder granules are coated with a hydrophilic material. Vinyl acetate based redispersable powder polymer derivatives, such as ethylene/vinyl acetate/vinyl chloride and ethylene/vinyl acetate/vinyl versatate terpolymers, may also be used as an internal binder. In addition, vinyl/acrylic copolymers, ethylene/vinyl acetate/vinyl versatate acrylate terpolymers, styrene acrylic copolymers, and vinyl acetate-vinyl versatate copolymers may be used as the internal binder. Any of these polymer classes may exist in either the powdered or in the emulsion form and may be introduced to the system either as a dry mix or in the slurry water.

Polyvinyl alcohol, also referred to by its IUPAC name poly 1-hydroxyethylene, may be used as the adhesive binder. However, because poly(vinyl alcohol) is very water soluble, it tends to migrate to the surface of the machinable thickness during set. As a result, a concentration gradient of poly(vinyl alcohol) localizes at the non-substrate contacting surface which inhibits moisture loss as well as has a tendency to entrain air during mixing which results in imperfections in the crystalline structure. Set time is also increased due to poly(vinyl alcohol) is retarding nature, and dimensional stability is reduced due to the entrained air.

Another potential alternative adhesive binder may be selected from the acrylic binders known in the art, but, like the poly(vinyl alcohols), they also tend to entrain air and retard set and are therefor less desirable. Preferably 100 parts of the above-described constituents are mixed with up to 50 parts, and more preferably 42 parts, water (by weight). However, as explained earlier, the volume of water necessary to create a workable slurry depends upon the ratio of beta hemihydrate calcium sulfate to alpha hemihydrate calcium sulfate in the mixture. Also, the amount of water needed will vary in the alternative embodiments depending upon the amount of internal binder in the mixture. One skilled in the art will be able to readily determine the amount of water needed based upon the plasticity or viscosity of the slurry.

Water used in mixing the plaster-based mixture should be as pure as possible to reduce contamination by impurities. Organic impurities tend to lengthen set time. Inorganic impurities tend to form salts which, during set, migrate to the surface of the machinable thickness, thus forming imperfections and hard spots. In addition, the water temperature should not exceed 110° F. as this is the maximum temperature for which calcium sulfate hemihydrate will undergo hydration to calcium sulfate dihydrate. It is also known to those skilled in the art that as you approach this temperature resultant crystal formation lends to a decrease in compressive strength.

To mix the mixture with water, the user should follow conventional mixing procedures, except that special care should be taken to avoid entraining air in the slurry. This includes sifting or strewing the plaster into the water slowly and evenly. For best results, it is preferred that a high-speed direct-drive propeller mixer be used with the mixing shaft set at an angle of 15 degrees from vertical. The propeller should clear the bottom of the mixing container by 1 to 2 inches and the shaft should be about halfway between the center and side of the container. The propeller rotation should force the mix downward.

By combining the above described calcium sulfate hemihydrate, internal binder and adhesive binder with water, a slurry results which may be applied to a substrate by trowel or poured into a mold.

In the second embodiment of the present invention, a thickening agent is added to the mixture described in the first embodiment. The thickening agent permits the slurry to flow under a shear stress and resist flow when the shear stress is removed as, for example, in the case where the slurry is spray applied to a substrate. Therefore, the thickening agent permits the slurry to form a machinable thickness when spray applied. The internal binder discussed above has a similar effect on the slurry because the binder slightly decreases flowability of the slurry. The internal binder causes the sprayed slurry to slightly thicken. Accordingly, the thickening agent must create a slurry that flows under shear stress so that it can be sprayed, yet resists flow when the stress is removed, therefore permitting the slurry to adhere to a substrate while setting, and to form a machinable thickness without the material running off the substrate.

In the preferred second embodiment, the thickening agent is cellulose based, and is preferably methylcellulose. In the preferred embodiment, it has been found that the addition of methylcellulose enhances the pseudoplastic properties of the slurry, i.e., the slurry has a lower viscosity under sheer than at rest. Methylcellulose is available under the trade name Methocel 228® from Dow Chemical of Midland, Mich.

When the mixture described as the first preferred embodiment is mixed with up to 1 percent, preferably 0.25 percent, by weight methylcellulose and combined with water to form a slurry, the desired flow properties are exhibited by the slurry and a machinable thickness of approximately 0.50 inches may be produced on a horizontal surface. Numerous other thickening agents are commercially available and one skilled in the art could readily find a suitable substitute for the preferred thickener in addition to the thickener.

In the third embodiment, in addition to the thickener, an accelerator is added to the slurry to decrease the set time of the machinable thickness and, therefore, permitting application of the slurry to a vertical surface. In addition, the presence of the accelerator permits control of expansion of slurry after application. When the mixture described as the second preferred embodiment is mixed with approximately 0.3 to 0.5 percent and, preferably 0.5 percent, by weight potassium sulfate and combined with water to form a slurry, the desired flow properties are exhibited by the slurry and a machinable thickness may be produced on both a vertical and a horizontal surface. As described below in relation to the spray apparatus, other accelerators are contemplated.

Addition of potassium sulfate to the mixture should be minimized, as it has been found that the presence of potassium sulfate in the set machinable thickness diminishes its strength. Other accelerators, such as aluminum sulfate, are commercially available and are well known to those skilled in the art of formulating machinable, plaster-based compositions.

An inert filler may be included in any of the three embodiments to improve the machinability and to decrease the density of the machinable thickness. The preferred filler is a surface coated, low density fine perlite comprising up to 1 percent by weight of the dry plaster-based mixture. Other known inert fillers include calcium carbonate, graphite, microspheres and the like.

A defoamer may also be added to any of the three embodiments. Defoamers are well known in the art and are used to decrease air entrainment in the slurry, therefore reducing air pockets in the composition after it is sprayed. A defoamer comprising approximately 0.1 to 0.2 percent, more preferably 0.16 percent, by weight of the dry mixture, produces the desired results. In the present invention, the preferred defoamer is Foamaster CN® defoamer and is available from Geo Specialty Chemicals of Ambler, Pa. Numerous other defoamers are commercially available and one skilled in the art could readily find a suitable substitute for the preferred defoamer.

To control set time, a plaster set retarder may be combined with any of the three embodiments. Set retarders are well known and, depending on the application, their concentrations can be adjusted to control the plaster set time. It has been found the addition of sodium citrate in a concentration of up to 0.10 percent, preferably 0.03 percent, by weight of the dry mixture provides adequate set retardation for the application of the sprayable plaster where a set time of more than sixty minutes is desired. It is also known that sodium citrate, citric acid, tartaric acid, sodium tartrate, soya protein or the like will provide similar results in concentrations that are known to those skilled in the art. Where a set time of sixty minutes or longer is desired, proteinaceous materials such as casein may be used in concentrations that are known to skilled practitioners.

To minimize chipping and stress cracking of the machinable thickness prior to full set, a green strength enhancer may be added to any of the three embodiments. Green strength enhancers are typically sodium or phosphate salts, such as sodium trimetaphosphate or the like. Other green strength enhancers are available and one skilled in the art could readily determine the requisite concentration to produce the desired result.

Any one of the above three described embodiments may also be stored in a ready mixed state or in slurry form using a chelating agent to prevent the calcium sulfate hemihydrate from hydrating to form calcium sulfate dihydrate. A chelating agent, such as tetrasodium pyrophosphate, could be added to the dry mixture. When the user combines the mixture with water, the presence of the chelating agent prevents the slurry from setting.

To permit set, an accelerating agent is then mixed with the slurry to reverse the chelation effect. Accelerating agents, such as sulfates, for example aluminum sulfate, are well known to those skilled in the art of formulating machinable plaster compositions. One preferred type of accelerator is described in commonly-assigned, copending application entitled "Efficient Catalyst For The Set Acceleration of Spray Applied Plaster", Ser. No. 09/502,609, filed concurrently herewith, and which is incorporated by reference herein.

Once a slurry described in the second and third embodiments is prepared, the slurry can be sprayed onto a substrate. Any number of materials can be used to assemble the substrate which, in the preferred embodiment, is the support structure of a model. Typical substrates are built with Styrofoam, wood, fiberglass or other lightweight formable materials. Preferably, the substrate should approximate the shape of the desired model and be slightly undersized. A fine droplet spray of the plaster will allow for the build up of 0.25 to 0.5 inches of the plaster on the substrate in a single coat. A uniform coat is best achieved when the slurry is sprayed in a back-and-forth motion over the substrate. Further, a fine droplet spray prevents air entrainment in the slurry as it builds up on the substrate.

Although a single coat of slurry is contemplated for most applications, multiple coats of the slurry may be applied to develop a desired thickness of plaster on the substrate. Between coats, each coat should be allowed to harden but it does not necessarily have to achieve Vicat set (as defined by ASTM C472). It is preferable that the coats are not allowed to dry. If a coat has dried, it should be moistened with water before the application of the next coat of slurry.

To decrease time between coats, a set accelerator in solution may be injected into the slurry spray as it exits the spray nozzle. Accelerators for gypsum compounds are well known (e.g., calcium sulfate dihydrate itself). The advantage of applying the accelerator at the spray nozzle is that the set of the mixed plaster compounds are well known (e.g., calcium sulfate dihydrate itself). The advantage of applying the accelerator at the spray nozzle is that the set of the mixed plaster will not be accelerated while the mixed plaster sits in the pressure pot or hopper before application on a substrate. The use of the accelerators at the spray nozzle, combined with the use of retarders in the slurry, allows for control of the process so the plaster set is retarded after the plaster is mixed but accelerated once the plaster is sprayed.

Once the desired number of coats of slurry have been applied to the substrate by spray or trowel, a model can be machined from the substrate. The machining process can occur in one or more steps. Depending on the equipment and application, it may be desirable that a first cut be a rough oversized cut and then have one or more additional cuts provide the final shape of the model. Best results are achieved when the plaster is set but not dry before it is machined. This allows for even less wear on the cutting tool and produces even less dust since extra water is present in the hardened gypsum.

With the present invention of a machinable plaster composition, a lightweight, economical, dimensionally accurate model may be prepared. Upon completion, the model may be used as a plug for a plug molding process, or may be used to create master casts for additional molds, as is well known in the art. It will be seen that the present plaster composition overcomes many of the drawbacks of models made using polyester and polyurethane foam. Advantages of the present composition include easier application, safe machinability, few air voids, less wear on the machining equipment and formation of generally even-sized shavings during machining.

The following example describes the preferred formulation for the sprayable and machinable plaster in accordance with the invention:

EXAMPLE I

| Chemical Name | Percent by Weight | Tradename/Vendor |
|---|---|---|
| Calcium sulfate hemihydrate | 89.86–89.90 | Hydrocal ® C-Base US Gypsum |
| Poly(ethylene glycol) powder | 6.00 | Carbowax 8,000 |

-continued

| Chemical Name | Percent by Weight | Tradename/Vendor |
| --- | --- | --- |
| Ethylene/vinyl acetate | 2.00 | Union Carbide Airflex RP226 |
| Methylcellulose | 0.25 | Wacker Chemical Methocel ® 225 Dow Chemical |
| Defoamer | 0.16 | Foamaster CN Geo Specialty Chem. |
| Perlite | 1.00 | Noble 200C |
| lime | 0.15 | Mason's Lime AP Green |
| Potassium sulfate | 0.50 | |
| Sodium citrate | 0.10–0.40 | Sodate US Gypsum |

Planks were prepared using the above noted formulation and permitted to cure for one week. It should be noted that Sodate contains 10 percent by weight sodium citrate and 90 percent by weight molding plaster.

Dimensional stability was determined by subjecting three specimens, each measuring 24 inches in length, to the following conditions. After each step, the following average changes in length were observed.

| | Environmental Conditions | Ave. Change(inches) |
| --- | --- | --- |
| Step 1. | 24 hours at 77° F. and 50% relative humidity. | −0.002 |
| Step 2. | 24 hours at −20° F. | −0.032 |
| Step 3. | 24 hours at 77° F. and 50% relative humidity | −0.001 |
| Step 4. | 6 hours at 130° F. | 0.015 |
| Step 5. | 24 hours at 77° F. and 50% relative humidity | 0.001 |
| Step 6. | 7 days at 100° F. and 100% relative humidity | 0.013 |
| Step 7. | 24 hours at 77° F. and 50% relative humidity | 0.004 |

Tensile strength and elongation determinations were made in accordance with the procedures of ASTM D 638-96. Specimens tested utilizing a crosshead speed of 0.2 inches per minute yielded an average tensile strength of 398 psi and average elongation of 0.07 percent.

Flexural strength and tangential flexural modulus determinations were made in accordance with the procedures of ASTM D 790-96. Specimens tested utilizing a crosshead speed of 0.11 inches per minute at a 4 inch span yielded an average flexural strength of 888 psi and average tangential flexural modulus of 925,000 psi.

Unnotched izod impact tests were performed in accordance with the procedures of ASTM D 4812-93. The specimens tested endured an average of 0.257 ft. lbs./in. before a complete break was observed.

Density determinations were made in accordance with the procedures of ASTM D 792-91. An average density of 1.53 g/cm$^3$ was observed for three specimens.

Heat deflection was performed on two specimens, at an outer fiber stress of 264 psi, in accordance with ASTM D 648-96. An average heat deflection of 308° F. was observed.

The average coefficient of linear thermal expansion was determined for two samples in accordance with ASTM D 696-91. The specimens yielded an average coefficient of thermal linear expansion of $1.19 \times 10^{-5}$ in./in./° F.

Thermal analysis by differential scanning calorimetry was performed. A major melt point of 162° C. and a minor melt point of 192° C. was observed.

EXAMPLE II

A slurry was prepared using the formulation noted in Example 1, machine mixed and poured into a cast mold. The slurry was permitted to cure at room temperature. A Vicat set point of 90 min. was observed. Compressive strengths were determined at the following intervals.

| Time | Compressive Strength |
| --- | --- |
| 1 hr. | 833 psi |
| 24 hrs. | 926 psi |
| 7 days | 2350 psi |

A maximum setting expansion of 0.159% was observed over the 7 day test period.

Figure 1:
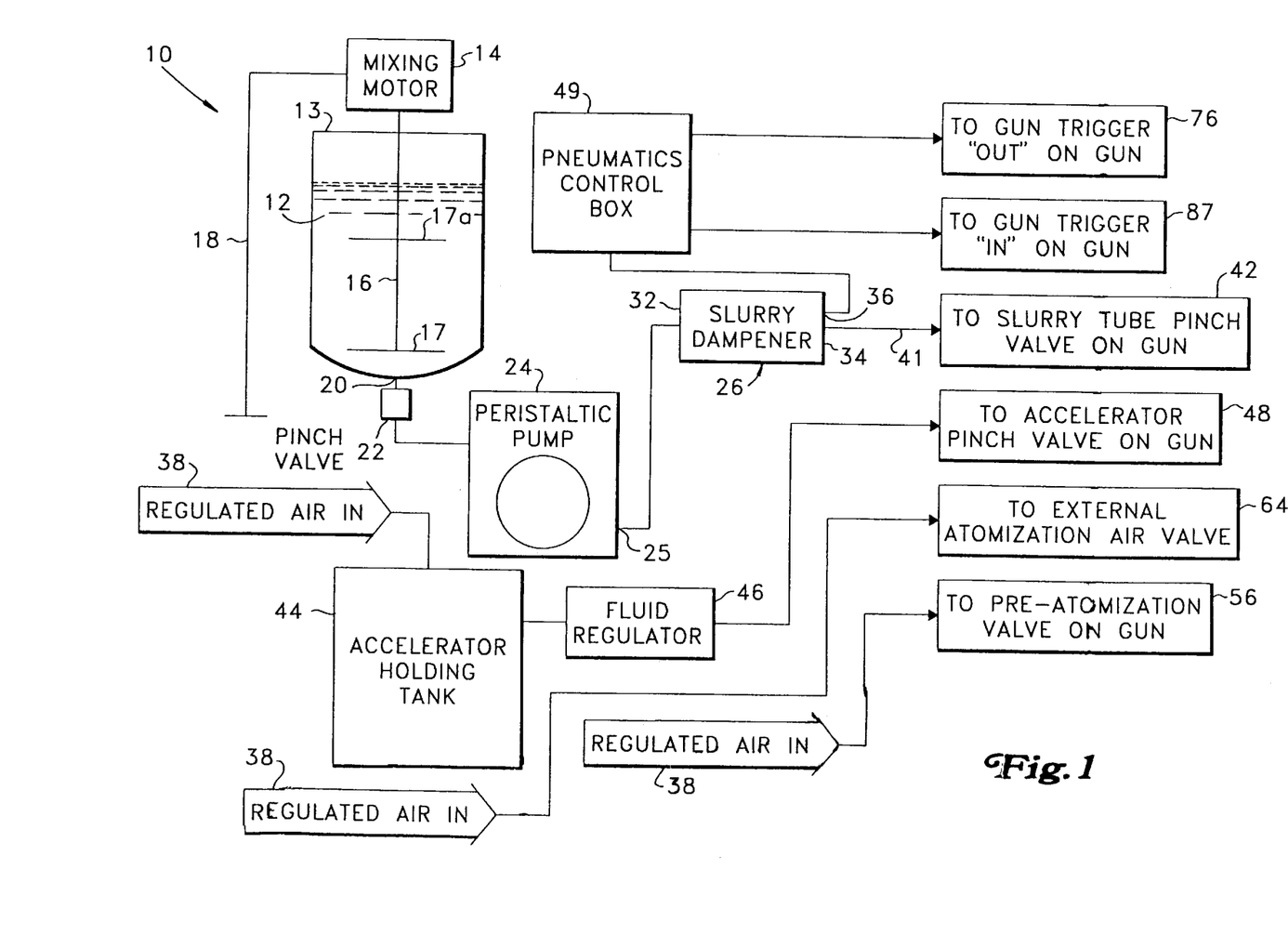
FIG. 1 is a partial schematic of the present high performance slurry spray system.

Referring now to FIG. 1, the present high performance slurry spray system is generally designated 10 and is designed for spraying settable slurries, such as plaster or gypsum cement slurries in industrial applications. The present apparatus is particularly suitable for applying a thin coating of slurry upon a generally vertical substrate, and achieving a relatively uniform appearing and setting layer.

The system 10 includes a slurry mixing and storage tank 12 suitably dimensioned for retaining a supply of slurry. In the present system, it is preferred that alpha or beta calcium sulfate hemihydrate or plaster slurry is used, however other compositions are contemplated, for example slurries containing a mixture of alpha and/or beta calcium sulfate hemihydrate and other non calcium sulfate hemihydrate slurries such as portland cement blends (sometimes referred to as a gypsum cement), or magnesium phosphate cement formulations, depending on the application. It is also preferred that the mixing and storage tank 12 be made of a lightweight, water and corrosion resistant, sturdy material such as rigid plastic. However, other equivalent materials are contemplated, including stainless steel, fiberglass and aluminum. It is also preferred that the tank 12 have an open top 13 to facilitate pouring of ingredients and for exposure to atmospheric pressure, and a conical or tapered bottom to facilitate complete drainage. It has been found that an open-topped tank facilitates uniform slurry flow rates, especially when coupled to a positive displacement pump, as described below.

A mixing motor 14 with an impeller 16 is provided and mounted relative to the tank 12 so that the impeller can engage the slurry in the tank. In the preferred embodiment, the impeller has two sets of blades, 17 and 17a. The first set 17 is located at a tip of the impeller, and the second set 17a is located approximately midway up the length of the impeller, and preferably about 4 to 5 inches below the level of liquid in the tank 12. It is preferred that the mixing motor 14 be at least of 5 HP capacity, and that the motor and the impeller 16 are mounted to a powered lift 18 for easy loading of the slurry ingredients, and easy cleaning of the tank 12. The lift 18 is configured so that the mixing motor 14 and the impeller 16 may be vertically withdrawn from, or inserted into, the tank 12. A second impeller may be added to the mixer shaft near the top of the tank to enhance mixing and lower required mixing time.

Plaster or gypsum cement slurry is mixed in a plastic tank by means of either an automated weighing process (i.e. load cells), or by a manual batching process, as is known in the art. Also, using known technology, automated mixing/cleaning cycles are also controlled via electromechanical methods.

An outlet 20 of the tank 12 is in fluid communication with a valve 22, which in the preferred embodiment is a pneumatically operated pinch valve. While other types of slurry control valves are also contemplated for use with the present system 10, pinch valves are preferred because they do not become clogged with set plaster. Instead, upon entering the valve, the slurry flows through a rubber tube which is surrounded by a pressurized canister. By selective application of pressure, in the preferred embodiment pneumatic pressure, the flow of slurry through the hose can be controlled. Such valves are known in the art, and because of their superior qualities for the present application, have been incorporated into all valving locations of the present system 10 which are potentially exposed to the slurry.

Downstream of the valve 22 is a pump 24, which is in fluid communication with the valve 22 and the tank 12. While a variety of pumps are contemplated for use with the present system, including, but not limited to gear pumps, piston pumps, diaphragm pumps, and progressive cavity pumps, the preferred type of pump in the system 10 is a positive displacement pump, specifically a peristaltic pump, and particularly a high-pressure type using a lubricating bath of glycerin to the internal stator hose. A variable speed DC motor (not shown) supplies power to the pump. Although it emits a pulsating output flow, the moving parts of the peristaltic pump do not become exposed to the settable slurry. A suitable commercial example of a preferred type of pump is the DL Series of pumps manufactured by PCM POMPES, 17 rue Ernest Laval—BP 35,972173 Vanves Cedex, France. The preferred pump 24 has a minimum flow rate of 84 tons/hr, a maximum flow rate of 20 m3/hr and a speed of between 5 to 133 rpm. In the preferred embodiment, an outlet 25 of the pump is configured as a quick connect fitting which is easily disconnected and allows the connection of a garden hose into the system for flushing purposes. Another suitable pump is a progressive cavity positive displacement pump manufactured by Moyno Products, Fluids Handling Division, Robbins & Meyers, Inc., Springfield Ohio. It has been found that the combination of the tank 12 with the open top 13, and the positive displacement pump 24 provided with a dampener as described below has resulted in a generally uniform flow rate of plaster slurry.

The purpose of the pump 24 is to pressurize the slurry in the system, and as acknowledged above, a drawback of peristaltic pumps is the pulsating output flow. If left untreated, this type of flow would result in an uneven flow of slurry upon the substrate, which would be undesirable in the type of targeted industrial application, i.e., the fabrication of large forms for fiberglass or other types of plastic molding. Accordingly, one feature of the present system is to provide a mechanism for dampening the pulses generated by the pump 24 in a way which will be suitable for use with the present type of settable slurry.

Figure 5:
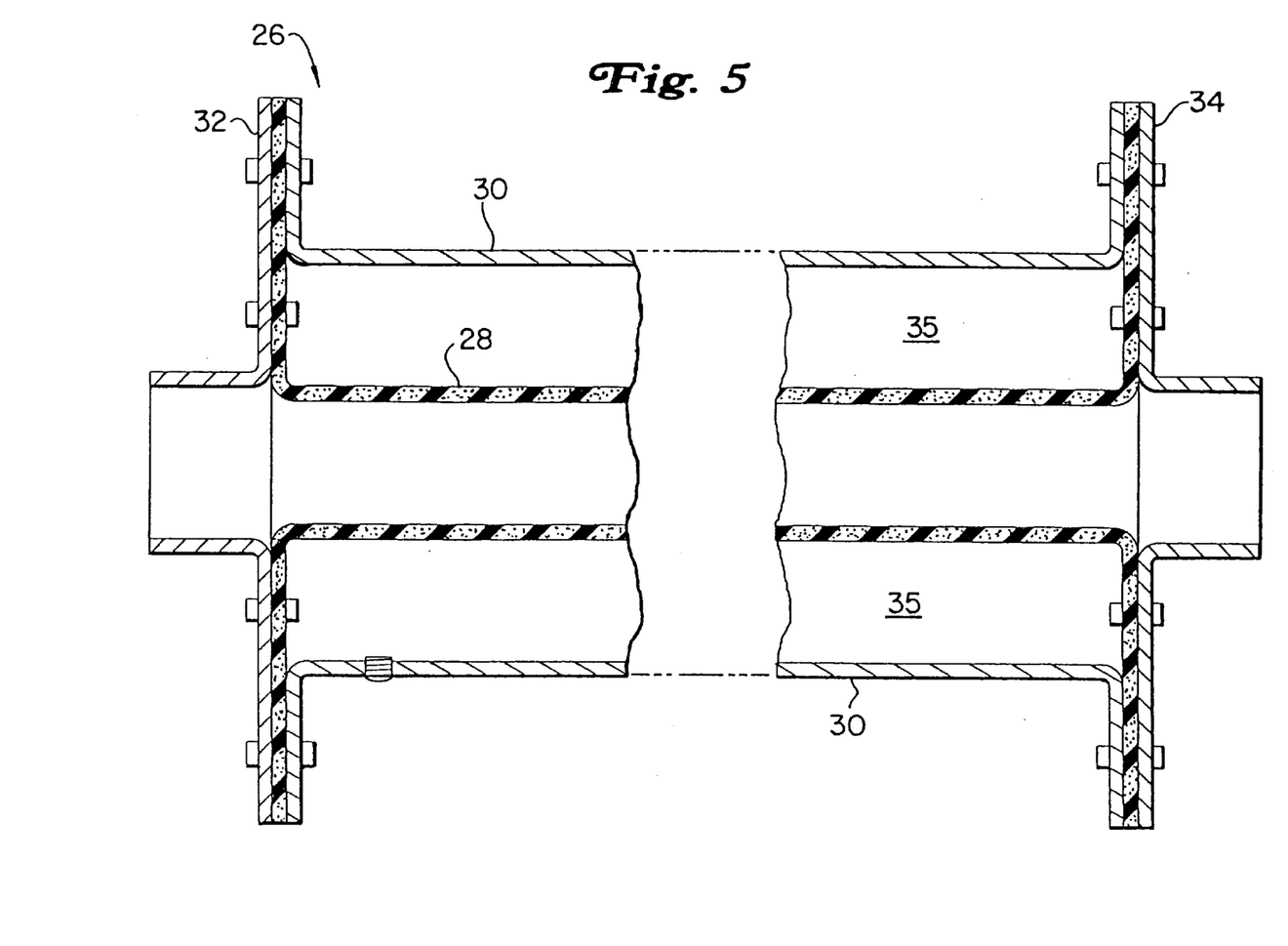
FIG. 5 is a vertical sectional view of the dampener depicted schematically in FIG. 1.

Referring now to FIGS. 1 and 5, an accumulator, surge suppressor or dampening device 26 which is suitable for use with the present system 10 operates under a similar principle as a pinch valve, and includes an inner flexible or rubber-like bladder or tube 28 which is in fluid communication with the pump 24, the valve 22 and the tank 12. A rigid, elongate cylindrical jacket 30 surrounds the tube 28, and is provided with flanged ends 32, 34 which are also sealingly coupled to ends of the tube. It is contemplated that the ends of the tube 28 may be sealingly secured to the flanged ends 32, 34 by chemical adhesive, threaded fasteners and clamps, combinations of the above, or other known fastening technologies. In this manner, a chamber 35 is created about the tube 28.

This sealed coupling allows for the introduction of pressurized gas (preferably air) through a pressurized air inlet 36 into the sealed chamber 35. Sufficient pressurized air is introduced from a compressor 38 into the cylindrical jacket 30 to regulate the flow pulses generated by the pump 24. The compressor 38 is preferably capable of providing 100 psi of air @ 30 CFM.

It is contemplated that the volume of pressurized air retained by the jacket 30 may vary with the application. It is also contemplated that other types of apparatus may be provided which employ pneumatic pressure to equivalently dampen the pulses of pressure in the pump output line, as does the dampener 26. It is further contemplated that the cylindrical jacket 30 will be of sufficient length to enable tie pneumatic pressure to sufficiently dampen the pressure surges produced by the pump 24. A spray applicator or spray gun 40 (best seen in FIG. 3) is placed in fluid communication with the flow of slurry emitted from the dampener 26, preferably through a braided or otherwise reinforced plastic hose 41 connected to a main pinch valve 42.

Another main component of the system 10 is a pressurized accelerant holding tank 44 into which is inserted a supply of accelerant for accelerating or hastening the setting time of the gypsum plaster slurry. Although a variety of known accelerants are contemplated, a preferred accelerant in the present system 10 is liquid aluminum sulfate and water. For other accelerants, see copending application U.S. Ser. No. 09/502,609, filed concurrently herewith for "Efficient Catalyst for the Set Acceleration of Spray Applied Plaster", which is incorporated by reference herein. Also, depending on the application of the system 10, other adjuvants beside accelerant can be introduced into the slurry flow.

Known slurry spray systems inject accelerant in the interior of the spray gun, which leads to premature setting of at least some slurry particles, and clogging of the gun. Another known system injects accelerant fluid externally into the slurry. However, an undesirable result of this approach is uneven setting of the plaster on the substrate through uneven distribution of the accelerant into the slurry.

In the present system, the accelerant is pressurized in the tank 44, passed through a regulator 46 and is in fluid communication with an accelerant pinch valve 48 located in close operational proximity to the spray gun 40. As will be described in further detail below, the pressurized accelerant is mixed with additional pressurized gas (preferably compressed air) to the point where the accelerant is vaporized. The vaporized accelerant is then introduced to the slurry, preferably at the point where the slurry is emitted from the spray gun 40. Thus, a uniform distribution of accelerant is obtained, and its introduction adjacent the outlet of the spray gun 40 solves both of the problems of prior systems. It is also contemplated that the accelerant may be alternately introduced in pressurized form through a liquid pressure pot or through an open tank with a mechanical pump, both of which are considered to be equivalent to the pressurized holding tank 44.

Figure 2:
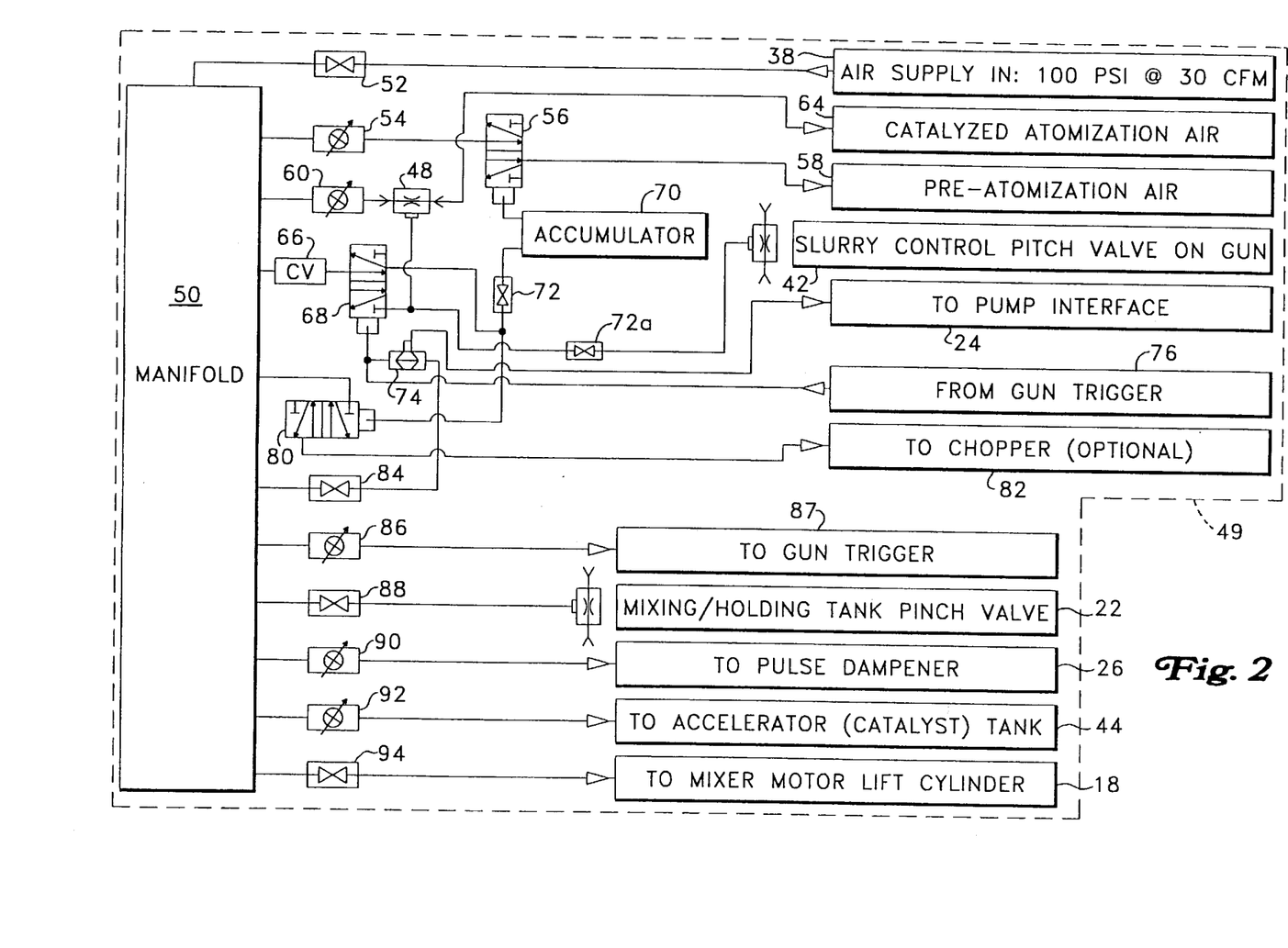
FIG. 2 is a partial schematic of the slurry spray system depicted in FIG. 1.

Referring to FIGS. 1 and 2, for operator safety and simplified maintenance, the present system 10 is pneumatically controlled through a main pneumatic control box 49. Included in the control box 49 is a manifold 50 to which is connected the main supply of compressed air from the compressor 38 through a conventional ball valve 52. Also connected to the manifold 50 is a pressure regulator 54 which is connected, through a pilot valve 56 to a first air supply inlet 58 on the spray gun 40. The inlet 58 is also known as the pre-atomization air inlet.

A second regulator 60 is connected through the pilot controlled pinch valve 48 to an air inlet 64 known as the atomization inlet of the spray gun 40. If the accelerant is provided from a paint-type pressure tank, as the holding tank 44, then the pinch valve 48 is preferably a fine pitched needle valve for regulating the flow of pressurized accelerant fluid. Also connected to the manifold 50 is a check valve 66 which is connected to a pilot valve 68 operating the pinch valve 48, and also connected to an accumulator 70 through a flow control valve 72. The pilot valve 68 is also connected through a flow control valve 72a to a main slurry control pinch valve 42 on the spray gun 40. The accumulator 70 maintains a designated pressure on the pilot valve 56 as is known in the art, and also is connected through the pilot valve 68, to the pump 24 through a shuttle valve 74, and to a FROM port 76 on a trigger valve 78 located on the spray gun 40.

If desired, a third pilot valve 80 may be connected to an optional fiberglass roving chopper 82 for providing a source of ground fiberglass fibers to the slurry. A push button valve 84 is connected to the shuttle valve 74 to allow the operator to manually operate the pump 24 during clean-out or purging cycles. Otherwise, the pump would only be activated when the trigger valve 78 on the spray gun was actuated. Also connected to the manifold 50 is a third pressure regulator 86 which is connected to an IN port 87 on the trigger valve 78. A toggle valve 88 is connected to the tank pinch valve 22.

A fourth pressure regulator 90 is connected to the pulse dampener 26, and a fifth regulator 92 is connected to the accelerator holding tank 44 to maintain pressure on the accelerant. Lastly, a toggle valve 94 controls the lift mechanism 18 for the mixer motor 14. In this manner, the manifold 50 controls operational pneumatic flow throughout the system 10.

Figures 3, 4:
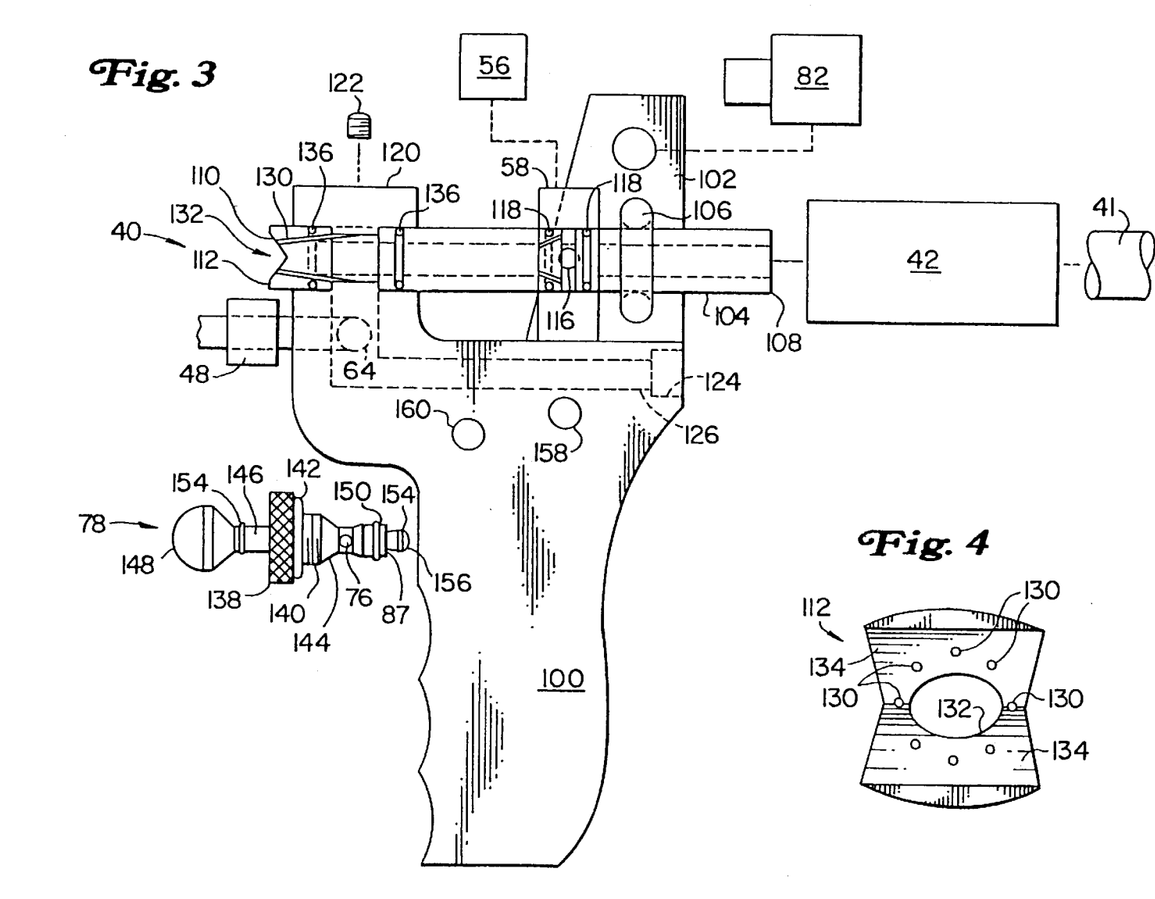
FIG. 3 is a diagrammatic side elevational view of the applicator or spray gun used in the system of FIGS. 1 and 2.
FIG. 4 is an end view of the nozzle used with the applicator of FIG. 3.

Referring now to FIG. 3, the spray gun 40 is depicted, and in the preferred embodiment, is based on a prior design produced by E.S. Manufacturing, Inc. of St. Petersburg, Fla., in which the plaster slurry was merely externally atomized by compressed air. The present spray gun 40 is designed to be used with all slurry viscosities, but most particularly, with very low viscosities, and at high volume outputs, especially when the slurry is cohesive (sticky). Included on the spray gun 40 is a handle 100 having a vertically extending chopper bracket 102 onto which is clamped a main slurry passageway or tube 104 by at least one U-clamp 106. In the preferred embodiment, the U-clamp 106 is fastened to the bracket 102 by threaded fasteners such as hex nuts (not shown), however other types of conventional fastening technologies are contemplated.

The main slurry tube 104 has an inlet or supply end 108 to which is connected, and in fluid communication with, the main slurry pinch valve 42. Opposite the supply end 108 is an outlet end 110, to which is secured a nozzle 112. It is contemplated that the outlet end 110 may have many configurations, including straight and in line with the passageway 104, in the preferred embodiment, the outlet end 110 gradually and slightly narrows toward the nozzle 112 to facilitate the creation of a uniform spray pattern.

Downstream of the main pinch valve 42 is the air supply inlet 58 which is configured as a halo fitting configured for circumscribing the main passageway 104. In addition, the inlet 58 and is in fluid communication with the main passageway 104 via a ring of arcuately spaced, forwardly angled (toward the outlet end 110), first compressed gas inlet openings 116 for introducing a flow of compressed gas (preferably air from the compressor 38) into the main passageway. This fitting 58 is also known as the preatomizing point, because the compressed air that is introduced here is forced into the main slurry flow to atomize it and make it easier to spray. To seal the air flow into the passageway 104, a pair of O-rings 118 are disposed on either side of the ring of openings 116. As will be seen from FIG. 3, the halo fitting 58 is disposed generally intermediate the supply end 108 and the outlet end 110. The compressed air that is introduced into the halo fitting 58 is controlled by the pneumatic pilot pinch valve 56 (best seen in FIG. 2).

Another feature of the present spray gun 40 is that it introduces two sources of compressed gas (air) into the slurry to properly atomize the slurry for improved spray performance. As described above, the first introduction of compressed gas occurs at the halo fitting 58. A second pressurized gas inlet 120 is disposed closer to the outlet end 110 than is the halo fitting 58 and is placed in relation to the passageway 104 for introducing a second supply of pressurized gas into the slurry. In the preferred embodiment, the second gas inlet 120 is linearly displaced from the halo fitting 58 however other dispositions are contemplated.

Yet another feature of the present system 10 is that the second inlet 120 is also the point at which the accelerant from the accelerant holding tank 44 is introduced in vaporized form, into the slurry. By introducing the accelerant adjacent the nozzle 112, the accelerant does not actually enter the passageway 104, and thus the clogging problem of prior art spray applicators is solved. While the preferred position of the second inlet 120 is adjacent the outlet end 110 and the nozzle 112, it is contemplated that, if the problem of premature slurry setting can be addressed, the second inlet may be positioned along the passageway 104 and closer to the halo fitting 58 so that the blended gas (accelerant and compressed air) is mixed with the combination of the slurry and the pressurized gas between the first inlet and the outlet end.

In shape, the second inlet 120 is preferably integrally cast, molded or formed with the handle 100, and is configured to circumscribe the passageway 104, and provides a second attachment point of the passageway 104 to the spray gun 40. In the preferred embodiment, a threaded fastener 122 is provided for anchoring the outlet end 110 of the passageway 104 to the spray gun 40.

The second pressurized air inlet 120 is placed in fluid communication with a supply of pressurized, so-called external preatomization air from the compressor 38. An inlet 124 in the spray gun 40 is in fluid communication with the air supply from the compressor 38. An air passageway 126 in the handle 100 provides a fluid conduit between the inlet 124 and the second inlet 120. Intermediate the inlet 124 and the second inlet 120 is the accelerant inlet 64 which receives pressurized accelerant from the holding tank 44 and is controlled by the pneumatic pinch valve 48 (best seen in FIG. 2). Thus, prior to reaching the second inlet 120, the compressed air and accelerant from the holding tank 44 is mixed or blended with additional external atomization air from the compressor 38. In this manner, the accelerant is vaporized so that it is more uniformly dispersable in the slurry.

Alternatively, it is also contemplated that the accelerant fluid may be introduced to the slurry spray at the nozzle 112 using a device known in the industry as a "catalyst injection device", a suitable example of which is manufactured by ITW-Binks Manufacturing Co. of Franklin Park, Ill. Such a device includes an accelerator tank holding accelerator fluid, which may be pressurized, like the holding tank 44. Compressed air, which will be used as the external air of atomization to be fed to the halo fitting 58, passes over a venturi, creating a vacuum which draws accelerator fluid from the tank. Flow from the venturi is monitored by a metering device as is known in the art.

The accelerator is vaporized into the stream of compressed air, after which it is carried through a reinforced hose to the spray gun 40 entering at point 124 (FIG. 3). This alternative construction is considered substantially equivalent to the preferred system described above, and is preferred when using a viscous accelerants. Yet another alternative is to introduce a relatively viscous accelerant, such as described in commonly assigned, co-pending U.S. patent application Ser. No. 09/502,609 filed concurrently herewith entitled "Efficient Catalyst for the Set Acceleration of Spray Applied Plaster" and incorporated by reference, through a mechanical pump, such as a piston, diaphragm or other type of metering pump directly to the spray gun 40 at point 64. It is also contemplated that, when slurries of other constituents, such as Portland cement or magnesium phosphate products are used, it could be introduced at the first air supply inlet 58.

Referring now to FIGS. 3 and 4, the second inlet 120 is provided with a plurality of diametrically spaced, inclined air jets 130 which receive the vaporized accelerant and dispense it from the nozzle 112 adjacent a main slurry outlet 132. In the preferred embodiment, the main slurry outlet 132 is located at the outlet end 110 of the passageway 104. The air jets 130 are preferably disposed in spaced, surrounding relationship to the main slurry outlet 132, which is of a relatively larger diameter than the jets 130. In this manner, the vaporized accelerant can be more evenly distributed in the slurry. In the preferred embodiment, the nozzle 112 is configured with a pair of inclined walls 134 so that the air jets 130 impact the slurry flow on an angle. As is the case with the inlet 58 the inlet 120 is provided on either side with an O-ring 136.

The trigger valve 78 is provided on the handle 100 of the spray gun 40 and is placed in fluid communication with the pneumatic control manifold 50 (best seen in FIG. 2). In the preferred embodiment, the trigger valve 78 is a plunger or piston type known in the art, and a suitable model is No. G300-001 produced by E.S. Manufacturing of St. Petersburg, Fla. The trigger valve 78 has a knurled outer boss 138 integrally affixed to a threaded nipple portion 140 which threadably engages a threaded bore (not shown) in the handle 100. An O-ring 142 maintains an airseal at that connection. A main body 144 of the valve 138 defines an axial chamber (not shown) in which reciprocates a poppet 146. An outer end 148 of the poppet 146 serves as the trigger which is actuated by the operator. In combination with the O-ring 142, a relatively smaller O-ring 150 on the main body 144 isolates the outlet 76. Two additional O-rings 154 on the poppet 146 pneumatically isolate the poppet. In a normally closed position, air pressure from the compressor 38 forces a small end 156 of the poppet against the valve body 144 where it is pneumatically sealed by the adjacent small O-ring 154.

To emit slurry, the incoming air 87 from the pressure regulator 86 and the air exiting from the regulator 86 provides the pneumatic pressure to operate the pilot valve 68. Upon depression of the trigger 148, the regulator 86 is placed in fluid communication with the pilot valve 68. Air is fed to the trigger valve 78 through an air inlet 158 located on the handle 100 of the spray gun 40, and is emitted from the outlet port 76 to a gun outlet 160 and into the manifold 50 to initiate flow of slurry.

Referring to FIG. 3, if desired, the system 10 may be equipped with the chopper attachment or chopper gun 82 for introducing chopped fiberglass roving fibers into the slurry stream. The incorporation of such fibers is intended to increase the strength of the set plaster. Such attachments are known in the art, and are pneumatically operated. In the system 10, the chopper attachment 82 is preferably mounted to the chopper bracket 102, and is connected to the pneumatic control box 48 so that it is operated by the pilot valve 80. Once mounted, the chopped fiberglass fibers are combined with the slurry externally of the passageway 104 as is known in the art.

Referring now to Table 1, a list of actual system performance parameters is provided, along with physical slurry data. The data indicates that approximately 21–23 pounds of slurry are sprayed per minute at a pump speed of about 40–45%. The pump speed is controlled by a variable speed DC motor (not shown) which in turn is controlled by an AC to DC converter/controller (not shown). Since the converter/controller provides variable DC output to the pump motor in increments measured as a percentage, that is why the speed is indicated as a percentage in Table 1. In Table 1, the dampener 26 is pressurized to 20 psi, the accelerator holding tank 44 is pressurized to about 40–42 psi, the accelerator flow rate is approximately 3 lbs./min, and is proportional to a slurry flow rate of 21 lbs./min. For these examples, the gun nozzle pressure at the inlet 120 was between 68 and 80 psi and the pre-atomization pressure at the first inlet 58 was approximately 100 psi.

In one example, prior to being sprayed the slurry had a consistency of 30 cc, referring to 100 parts by weight of inventive plaster mixture in 30 parts by weight of clean, potable water. In actuality, the slurry mix resulted from a mixture of 150 lbs of sprayable, machinable plaster mixture, 45 lbs of water and a mix time of 10 minutes. In the second example, 250 lbs of plaster mixture product, 75 lbs of water and a mix time of 12.5 minutes was employed.

TABLE 1

|  | Trial 1 | Trial 2 |
| --- | --- | --- |
| Pump Speed (%) | 40.00 | 45.00 |
| Slurry Delivery Rate (lbs./min.) | 21.00 | 23.00 |
| Pulse Dampener Pressure (PSI) | 20.00 | 20.00 |
| Accelerator Tank Pressure (PSI) | 40.00 | 42.00 |
| Accelerator Flow Rate (%) | 50.00 | 50.00 |
| Gun Nozzle Aspiration (PSI) | 80.00 | 68.00 |
| Gun Pre-atomization [Burp] (PSI) | 100.00 | 100.00 |
| Slurry Consistency (CC) | 30.00 | 30.00 |
| Inventive Plaster Mixture | 150.00 | 250.00 |
| Water (lbs.) | 45.00 | 75.00 |
| Mix Time (min.) | 10.00 | 0.52 |

Referring now to Table 2, pump speed vs. slurry output is indicated, and demonstrates that as pump speed is increased, slurry output generally increased, however at higher speeds, the slurry output did not increase as dramatically.

TABLE 2

PUMP SPEED VS. SLURRY OUTPUT

| Pump Speed (%) | Slurry Delivery Rate (lbs./min.) | Pulse Dampener Pressure (PSI) |
| --- | --- | --- |
| 40.00 | 21.00 | 20.00 |
| 60.00 | 30.00 | 20.00 |

TABLE 2-continued

PUMP SPEED VS. SLURRY OUTPUT

| Pump Speed (%) | Slurry Delivery Rate (lbs./min.) | Pulse Dampener Pressure (PSI) |
|---|---|---|
| 80.00 | 37.50 | 20.00 |
| 100.00 | 42.00 | 20.00 |

In operation, a supply of slurry is provided to the mixing tank 12 and stirred by the impeller 16. When the operator wants to initiate slurry and accelerator flow, the trigger 148 is depressed axially against the system pressure, placing the air flow to the trigger valve 138 in communication with the outlet 152. The outlet 152 is then in fluid communication with the manifold 50, and will operate the various pinch valves commence the flow of slurry through the pump 24, the dampener 26 and to the spray gun. Simultaneously, compressed air is fed from the compressor 38 to the halo fitting 58, to the accelerator holding tank 44, and to the gun inlet 124 for blending with the accelerant.

Thus, the slurry is first mixed with a preatomizing air at the halo fitting 58 to initially increase flowability. Next, the vaporized accelerant is blended into a second source of compressed air prior to ejection or emission as a blended gas into the slurry. In the preferred embodiment, this blended gas is introduced into the slurry at the nozzle 112. In this manner, the accelerant is more evenly distributed in the slurry, and spray gun clogging is prevented. The present system 10 also features the use of the dampener 26 with the positive displacement peristaltic pump 24 to provide a relatively uniform flow of slurry. The open-topped tank 12 also provides an atmospheric pressure environment for slurry mixing and loading, which further facilitates relatively uniform flow rates. Upon completion of the spraying process, the tank 12 can be filled with water and flushed through the system 10.

While particular embodiments of the sprayable and machinable plaster of the present invention have been shown and described, it will be appreciated by those skilled in the art that changes and modifications may be made thereto without departing from the invention in its broader aspects and as set forth in the following claims.

What is claimed is:

1. A plaster mixture for forming a machinable composition, said mixture comprising:
   from about 65% to about 90% by weight of calcium sulfate hemihydrate;
   from about 1% to about 13% by weight of an internal lubricating dispersible binder that disperses when said plaster mixture is mixed with water to form a slurry, is deposited throughout the calcium sulfate dihydrate crystalline structure after set, and allows the hardened composition to hold a sharp corner and a smooth contour when machined; and
   from about 1% to about 5% by weight of an adhesive binder for adhering said plaster mixture to a substrate.

2. The mixture according to claim 1 wherein said internal binder is a free flowing polymer powder.

3. The mixture according to claim 1 wherein said internal binder is a poly(ethylene glycol).

4. The mixture according to claim 1 wherein said internal binder is a poly(ethylene glycol) having a molecular weight of approximately 8,000.

5. The mixture according to claim 1 wherein said internal binder is a poly(ethylene glycol), and said adhesive binder is an ethylene/vinyl acetate copolymer.

6. The mixture according to claim 1 wherein said adhesive binder is a water redispersible composition having adhesive properties.

7. The mixture according to claim 1 wherein said adhesive binder is an ethylene/vinyl acetate copolymer.

8. The mixture according to claim 1, further comprising a thickening agent for permitting a slurry of said mixture in water to flow under a shear stress and resist flow when the shear stress is removed.

9. The mixture according to claim 8 wherein said thickening agent is a cellulosic material.

10. The mixture according to claim 1 wherein said mixture comprises approximately 65 to 90 percent by weight of said calcium sulfate hemihydrate, approximately between 1 and 13 percent by weight of said internal binder, and approximately between 1 and 5 percent by weight of said adhesive binder.

11. The mixture according to claim 10 wherein said internal binder is poly(ethylene glycol), and said adhesive binder is ethylene/vinyl acetate copolymer.

12. The mixture according to claim 10 further including approximately 1 percent by weight of methylcellulose.

13. The mixture according to claim 11 wherein said mixture comprises approximately 6 percent by weight of said poly(ethylene glycol).

14. The mixture according to claim 11 wherein said mixture comprises approximately 8 percent by weight of said poly(ethylene glycol).

15. The mixture according to claim 1, further comprising an accelerator for reducing the set time of a slurry of said mixture in water after being applied to a substrate.

16. The mixture according to claim 15 wherein said accelerator is potassium sulfate.

17. The mixture according to claim 14 wherein said mixture comprises approximately 0.3 to 0.5 percent by weight potassium sulfate.

18. The mixture according to claim 1, further comprising a defoamer for minimizing air entrainment in a slurry of said mixture in water.

19. The mixture according to claim 18 wherein said mixture comprises up to approximately 0.2 percent by weight of said defoamer.

20. The mixture according to claim 1 further including a set time retarder comprising one or more of sodium citrate, citric acid, tartaric acid sodium tartrate, a proteinaceous material, or a phosphate.

21. The mixture according to claim 20 wherein said mixture comprises up to approximately 0.1 percent by weight sodium citrate.

22. A method for making a model, comprising:
   preparing a substrate in the approximate shape and smaller than said model;
   preparing a slurry of a plaster mixture and water;
   spraying a first coat of said slurry on said substrate;
   allowing said slurry to harden to form a machinable thickness; and
   machining said machinable thickness to the shape of said model.

23. The method according to claim 22 wherein said plaster mixture is approximately 72 to 90 percent by weight calcium sulfate hemihydrate, approximately 4 to 12 percent by weight amorphous poly(ethylene glycol), and up to approximately 5 percent by weight ethylene/vinyl acetate copolymer.

24. The method according to claim 23, further comprising the steps of spraying additional coats of said slurry over said first coat after said first coat has hardened and allowing said slurry to harden between each said additional coat.

25. The method according to claim 24 wherein said first coat and said additional coats are not allowed to dry prior to machining.

26. The method according to claim 23, further comprising the step of adding a set accelerator to the mixture while spraying the mixture.

* * * * *

UNITED STATES PATENT AND TRADEMARK OFFICE
CERTIFICATE OF CORRECTION

PATENT NO.    : 6,355,099 B1
DATED         : March 12, 2002
INVENTOR(S)   : Immordino et al.

It is certified that error appears in the above-identified patent and that said Letters Patent is hereby corrected as shown below:

Column 1,
Line 51, delete "build tip" and insert -- build up -- therefore.

Column 3,
Line 24, delete "dehydrate" and insert -- dihydrate -- therefore.

Column 5,
Line 39, delete "poly(vinyl alcohol) is" and insert -- poly(vinyl alcohol)'s -- therefore.
Line 44, delete "therefor" and insert -- therefore -- therefore.

Column 12,
Line 14, delete "tie" and insert -- the -- therefore.

Column 13,
Line 63, delete "and".

Column 14,
Line 21, insert -- , -- after "fitting 58".

Column 15,
Line 47, delete "airseal" and insert -- air seal -- therefore.

Signed and Sealed this

Sixth Day of August, 2002

*Attest:*

JAMES E. ROGAN
*Attesting Officer*      *Director of the United States Patent and Trademark Office*